ALDEN H. JACOBSON
INVENTOR.
BY
Norman S. Blodgett

April 5, 1966   A. H. JACOBSON   3,244,029
MACHINE TOOL

Filed Feb. 28, 1964   2 Sheets-Sheet 2

ALDEN H. JACOBSON
INVENTOR.

BY
*Norman S. Blodgett*

United States Patent Office 3,244,029
Patented Apr. 5, 1966

3,244,029
MACHINE TOOL
Alden H. Jacobson, Paxton, Mass., assignor to The Heald Machine Company, Worcester, Mass., a corporation of Delaware
Filed Feb. 28, 1964, Ser. No. 348,020
2 Claims. (Cl. 77—3)

The invention relates to a machine tool and, more particularly, to apparatus arranged to generate a surface of revolution in a workpiece.

One of the important problems confronting the machine tool industry is that of feeding the tool and the workpiece relative to one another during a machining operation. Generally speaking, if the feeding mechanism is accurately made, it cannot be strong enough to bring about the forces necessary to accomplish the machining operation in a short time. Conversely, if the feed apparatus is made in a rugged fashion, it is difficult to make it accurate enough to be effective in certain types of feeding operations. Furthermore, the known feed mechanisms have been quite expensive and require considerable amount of maintenance. These and other difficulties experienced with the prior art devices have been obviated in a novel manner by the present invention.

It is, therefore, an outstanding object of the invention to provide a machine tool incorporating a feeding mechanism which will feed the tool and workpiece relative to one another very accurately and, at the same time, with sufficient force to produce substantial stock removal.

Another object of this invention is the provision of a machine tool having a feed regulator which is accurately made, which regulator is not, however, itself subjected to the maximum machining forces.

A further object of the present invention is the provision of a machine tool incorporating a feed mechanism which is simple and rugged in construction, which is relatively inexpensive to manufacture, and which is capable of a long life of useful service with a minimum of maintenance.

It is another object of the instant invention to provide a machine tool which is capable of large machining forces and in which the rate of feed between the tool and workpiece is accurately controlled at all times.

With these and other objects in view, as will be apparent to those skilled in the art, the invention resides in the combination of parts set forth in the specification and covered by the claims appended hereto.

Figure 1:
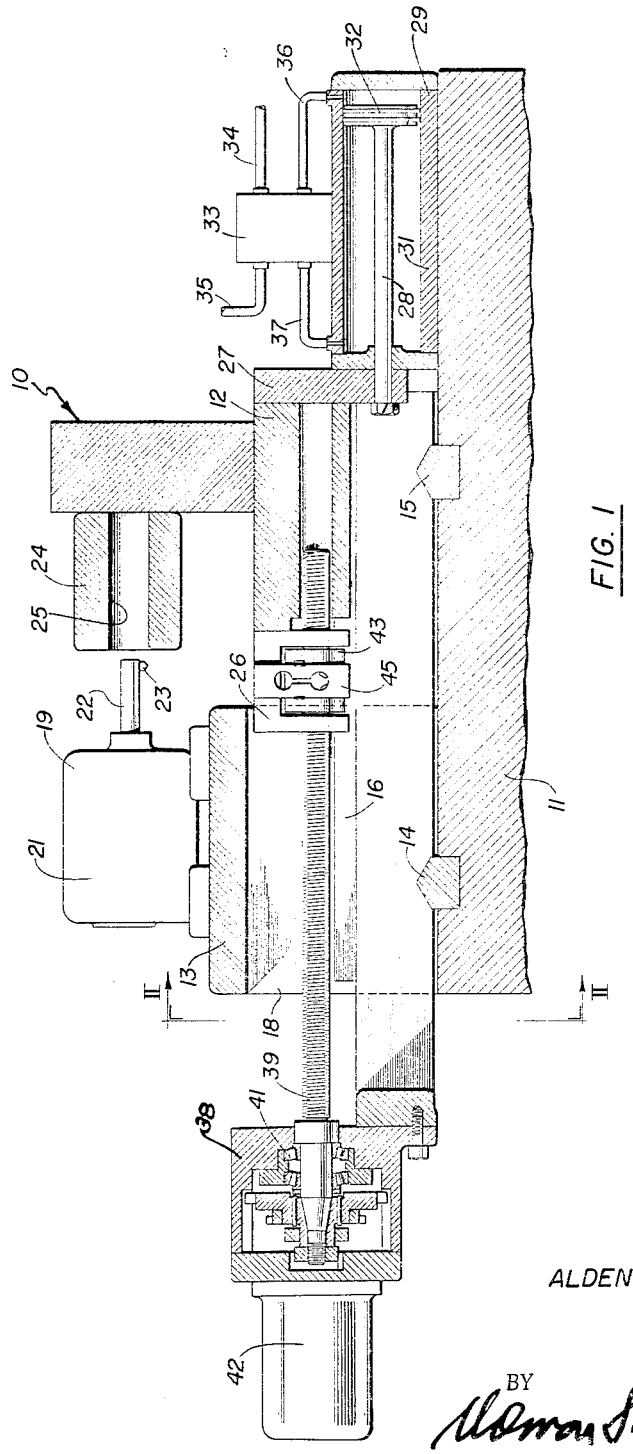
Figure 2:
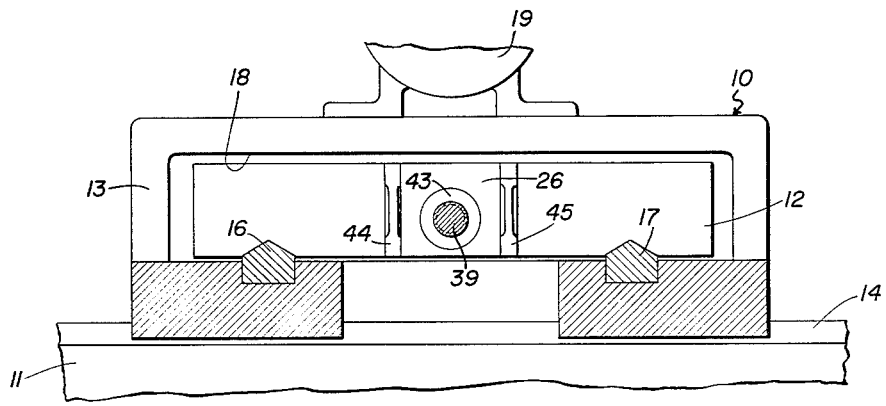
Figure 3:
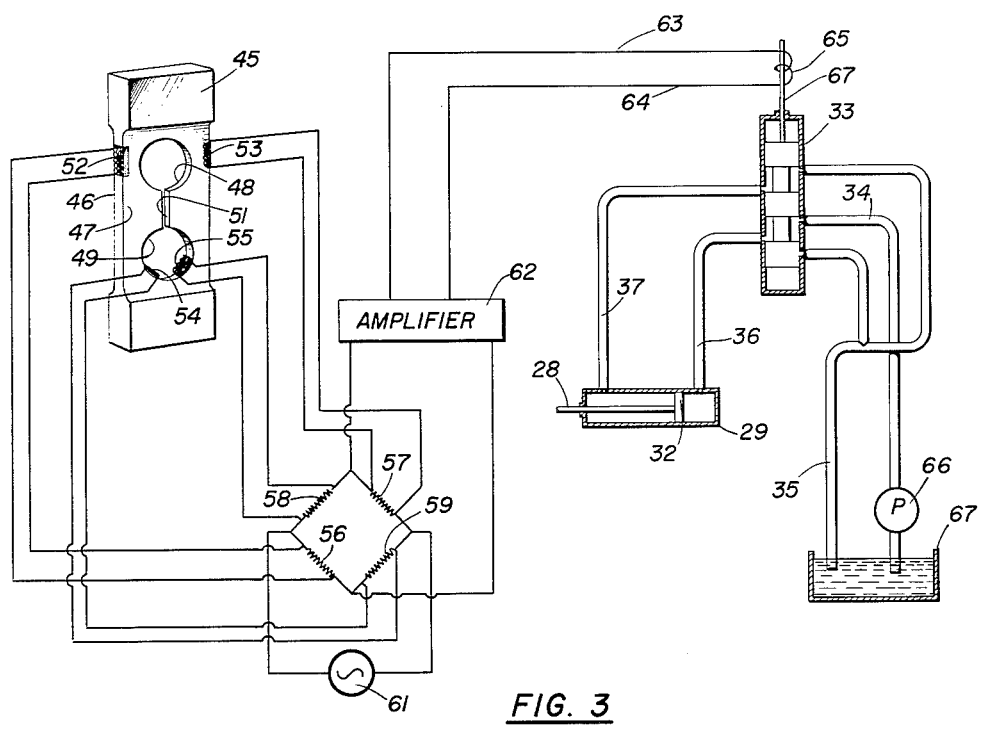

The character of the invention, however, may be best understood by reference to one of its structural forms as illustrated by the accompanying drawings in which:

FIG. 1 is a longitudinal sectional view of a machine tool incorporating the principles of the present invention, FIG. 2 is a transverse sectional view of the machine tool taken on the line II—II of FIG. 1, and FIG. 3 is a somewhat schematic view of certain electrical and hydraulic apparatus associated with the machine tool.

Referring first to FIGS. 1 and 2, wherein are best shown the general features of the invention, the machine tool, indicated generally by the reference numeral 10, is shown as consisting of a base 11 on which is mounted a workpiece support 12 and a tool support 13. The tool support 13 is slidable on rails 14 and 15 extending upwardly from the upper surface of the base 11. The workpiece support 12 is, on the other hand, slidable longitudinally relative to the tool support 13 on rails 16 and 17.

The tool support 13 is in the form of a bridge and is provided with a longitudinal passage 18 through which the workpiece support 12 may move. On the upper surface of the tool support 13 is mounted a tool 19 consisting of a tool head 21 which, for the purposes of the present invention, is shown as of the motorized variety capable of driving a longitudinal spindle 22 carrying at its outer end a tool element 23. The tool head 21, spindle 22, and the tool element 23 are of the type suitable for a boring operation. Mounted on the workpiece support 12 is a workpiece 24 having a surface 25 which is to be finished and which, for the purposes of illustration, is shown as being a bore.

Fastened to one end of the workpiece support 12 and extending downwardly therefrom is an abutment 26 and from the other end extends an abutment 27. The lower end of the abutment 27 is fastened to the piston rod 28 of a hydraulic linear actuator 29 having a cylinder 31 fastened to the upper surface of the base 11, the piston rod being provided with a piston 32 slidable in the cylinder. Mounted on the top of the cylinder 31 is a servo valve 33 having an input conduit 34 and a dumping conduit 35 as well as output conduits 36 and 37 leading to the outer ends of the cylinder 31. Mounted at the other side of the table 12 from the actuator 29 and mounted on the tool support 13 is a feed regulator 38 consisting of a screw 39 mounted at one end in a bearing 41 and driven by a motor 42. The screw 39 engages a nut 43 mounted and held against rotation in the abutment 26. The screw 39 is of the instrument-type and is very finely made with a very accurate thread and the mating nut 43 is similarly constructed. Mounted on the sides of the nut 43 and the abutment 26 are blocks 44 and 45 forming part of a strain gauge apparatus.

Referring now to FIG. 3, the block 45 is shown as formed of steel and having a generally rectangular configuration. The upper end of each block is fastened to the abutment 26, while the lower end is fastened to the nut 43. The central portion is made thinner than the ends by milling recesses 46 and 47. Adjacent one end, the block is provided with a bore 48 and adjacent the other end it is provided with a bore 49. A slot 51 extends entirely through the block and joins the two bores. Mounted on the side of the block adjacent the bore 48 is a strain gauge 52 which is of the resistance-type, known as an SR–4 gauge, having electrical elements whose resistance varies with the strain placed upon it. Another strain gauge 53 is located on the other side of the block directly opposite the strain gauge 52. Similarly, two further strain gauges 54 and 55 are located on the inside surface of the bore 49 and are symmetrically arranged about a line joining the centers of the two bores. The strain gauge 52 is connected in parallel with a resistor 56, the strain gauge 53 is connected in parallel with a resistor 57, the strain gauge 55 is connected in parallel with a resistor 58, and the strain gauge 54 is connected in parallel with a resistor 59. The resistors 56, 57, 58 and 59 represent the resistance elements of strain gauges associated with the block 44 in the same way that the strain gauges 52, 53, 54, and 55 are associated with the block 45. The resistors 56, 57, 58, and 59 and their associated strain gauges are connected as a Wheatstone bridge and the common junctions of the resistors 56 and 58 are connected to one side of an alternating current electrical source 61, the other side of which is connected to the common point between the resistors 57 and 59. The common point between the resistors 57 and 58 is connected to an input post of an amplifier 62, while the common point between the resistors 56 and 59 are connected to the other input post of the same amplifier. The output of the amplifier 62 is connected by leads 63 and 64 to a coil 65 of the servo valve 33. The input conduit 34 is connected to a pump 66 whose input resides in a tank 67 of hydraulic fluid. The dumping conduit 35 returns fluid to this same tank. The coil 65 operates on a spool 67 forming part of the valve 33 and directing pressure oil to and from the hydraulic linear actuator 29 described above.

The operation of the invention will now be readily understood in view of the above description. With the tool head 21 rendered operative, the spindle 22 is rotated carrying the tool element 23 with it. The workpiece 24 is moved into proximity with the tool 19 by the movement of the workpiece support 12 over the upper surface of the tool support 13. This takes place by admission and removal of oil from opposite sides of the piston 33 of the hydraulic linear actuator 29. The rotation of the spindle 22 with the tool element 23 against the workpiece 24 causes the generation of the surface 25 which is to be finished. At the same time the motor 42 is rotating the screw 39 and the rotation of the screw 39 pulls the nut 43 with it; the nut brings a force to bear on the blocks 44 and 45, tending to bend them relative to the workpiece support 12. This causes a change in resistance of the strain gauges 52 and 53. The strain gauges 54 and 55 show no change of resistance, despite bending of the block because they are located on a neutral plane of bending. Since all four strain gauges are located in a Wheatstone bridge, the change in resistance of the strain gauges 52 and 53 relative to a pre-determined resistance causes a change in the output current; this change is increased in the amplifier 62 and results in a change in current in the coil 65 associated with the servo valve 33. This causes the spool 67 to occupy a different position in the valve body and to change the rate of feed of oil to the hydraulic linear actuator 29, so that the feed of the workpiece 24 relative to the tool 23 is changed.

As a practical matter, the screw 39 moves the nut 43 relative to itself and it is the purpose of the present invention to cause the workpiece table 12 to follow this nut with a high degree of accuracy. If, due to a wrong rate of feed produced by the actuator 29, the workpiece table 12 does not follow the nut 43 closely, the amount of imbalance is demonstrated as a bending in the blocks 44 and 45. This bending is demonstrated as a variation of the signal coming from the Wheatstone bridge and produces a change in the servo valve which corrects for this imbalance. The workpiece 24, therefore, follows the feed regulator 38 very closely.

It will be understood that the operation of the feed regulator 38 may be changed from time to time and it will be assumed that (through use of the present apparatus) the workpiece table and the workpiece 24 will follow this change very closely. The rate of rotation of the motor 42 can change the rate of rotation of the screw 39 and, therefore, it is possible to change the feed of the workpiece and tool element relative to one another from time to time. This is sometimes accomplished to produce different rates of feed in different portions of a machining cycle.

It can be seen that the screw 39 and the rest of the associated feed apparatus 38 can be very accurately made and can be used to produce the feed without itself being being subjected to extremely high forces. This means that the feed regulator need not be built with any substantial strength; there is no danger of its stretching or bending under the feeding forces and producing erroneous feed rates. As can be seen from an examination of the invention, the entire apparatus is very simple and rugged and is capable of operation for long periods of time with a minimum of maintenance.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   (a) a base,
   (b) a workpiece support mounted on the base,
   (c) a tool support mounted on the base,
   (d) a motor bringing about relative feeding movement between the supports to bring about engagement of a tool with a workpiece,
   (e) an abutment extending from one of the supports and carrying a nut,
   (f) a feed regulator comprising an instrument-type screw associated with the other of the supports, the screw engaging the nut, and
   (g) a strain gauge extending between the abutment and the nut and regulating the operation of the motor so as to maintain the strain in the nut at a predetermined value.

2. A machine tool, comprising
   (a) a base,
   (b) a workpiece support mounted on the base,
   (c) a tool support mounted on the base,
   (d) a motor bringing about relative feeding movement between the supports to bring about engagement of a tool with a workpiece,
   (e) a block extending from one of the supports,
   (f) a feed regulator associated with the other of the supports, the regulator comprising a motor-driven screw engaging a nut associated with the block,
   (g) a strain gauge mounted on the block, and
   (h) means connecting the strain gauge to the said motor to maintain the strain on the block at a predetermined level.

References Cited by the Examiner

UNITED STATES PATENTS

| | | | |
|---|---|---|---|
| 2,110,593 | 3/1938 | Ernst | 77—32.7 |
| 2,754,567 | 7/1956 | Crane | 77—32.7 |

WILLIAM W. DYER, Jr., *Primary Examiner.*

DONALD R. SCHRAN, *Examiner.*